(12) United States Patent
Ran et al.

(10) Patent No.: US 9,374,202 B2
(45) Date of Patent: Jun. 21, 2016

(54) METHOD, APPARATUS, AND SYSTEM FOR MEASUREMENT OF NOISE STATISTICS AND BIT ERROR RATIO ESTIMATION

(71) Applicant: Intel Corporation, Santa Clara, CA (US)

(72) Inventors: Adee O. Ran, Maayan Baruch (IL); Amir Mezer, Haifa (IL); Ophir Gazinski, Ramat Yishai (IL); Sanjay R. Ravi, Hillsboro, OR (US); David G. Ellis, Tualatin, OR (US); Stephen J. Peters, Aloha, OR (US); Jeffrey M. Shuey, Irmo, SC (US)

(73) Assignee: Intel Corporation, Santa Clara, CA (US)

( * ) Notice: Subject to any disclaimer, the term of this patent is extended or adjusted under 35 U.S.C. 154(b) by 280 days.

(21) Appl. No.: 13/842,320

(22) Filed: Mar. 15, 2013

(65) Prior Publication Data

US 2014/0281763 A1 Sep. 18, 2014

(51) Int. Cl.
G06F 11/00 (2006.01)
G01R 19/00 (2006.01)
H04L 1/00 (2006.01)
H04L 1/20 (2006.01)

(52) U.S. Cl.
CPC .................... *H04L 1/203* (2013.01)

(58) Field of Classification Search
None
See application file for complete search history.

(56) References Cited

U.S. PATENT DOCUMENTS

| 7,218,688 | B2 * | 5/2007 | Nakano ............... 375/317 |
| 8,218,685 | B2 * | 7/2012 | Campeau ............. 375/316 |
| 8,248,107 | B2 * | 8/2012 | Ding et al. ............ 327/55 |
| 2012/0033685 | A1 * | 2/2012 | Doblar et al. ........ 370/535 |

OTHER PUBLICATIONS

Müller, M. et al, "Total Jitter Measurement at Low Probability Levels, Using Optimized BERT Scan Method", DesignCon 2005 proceedings, IEC 2005, 18 pages.
Säckinger, E. (2005) Appendix A: Eye Diagrams (pp. 318-319), in "Broadband Circuits for Optical Fiber Communication", John Wiley & Sons, Inc., Hoboken, NJ, USA, 26 pages.

* cited by examiner

*Primary Examiner* — Justin R Knapp
(74) *Attorney, Agent, or Firm* — Patent Capital Group (57) ABSTRACT

A sample voltage is received from a device at a first slicer element and a second slicer element. A decision by the first slicer element based on the sample voltage is identified and compared with a decision of the second slicer element based on the sample voltage. The decision of the second slicer element is to be generated from a comparison of the sample voltage with a reference voltage for the second slicer element. Comparing the decisions can be the basis of a soft error ratio determined for a device.

27 Claims, 9 Drawing Sheets

METHOD, APPARATUS, AND SYSTEM FOR MEASUREMENT OF NOISE STATISTICS AND BIT ERROR RATIO ESTIMATION

FIELD

This disclosure pertains to computing system, and in particular (but not exclusively) to noise statistics and bit error ratio estimation.

BACKGROUND

As electronic apparatuses become more complex and ubiquitous in the everyday lives of users, more and more diverse requirements are placed upon them. To satisfy many of these requirements, many electronic apparatuses comprise many different devices, such as a CPU, a communication device, a graphics accelerator, etc. In many circumstances, there may be a large amount of communication between these devices. Furthermore, many users have high expectations regarding apparatus performance. Users are becoming less tolerant of waiting for operations to be performed by their apparatuses. In addition, many apparatuses are performing increasingly complex and burdensome tasks that may involve a large amount of inter-device communication. Therefore, there may be some communication between these devices that would benefit from rapid communication and an acceptable reduced bit error rate.

BRIEF DESCRIPTION OF THE DRAWINGS

Embodiments are illustrated by way of example and not by way of limitation in the FIGURES of the accompanying drawings, in which like references indicate similar elements and in which.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to measurement of noise statistics and bit error ratio (BER) estimation in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from an improved noise statistics and bit error rate (BER) estimation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for back channel equalization.

Figure 1:
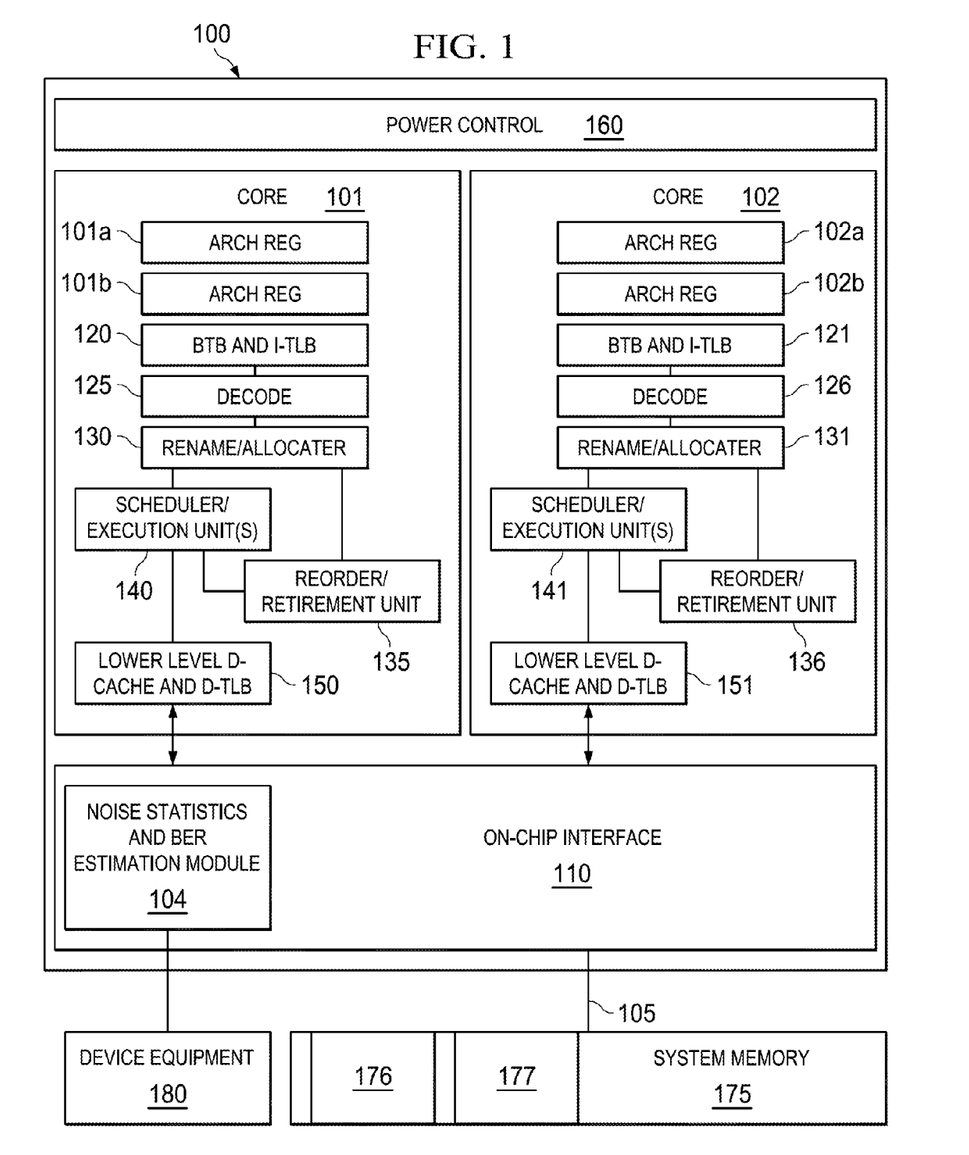
FIG. 1 illustrates an embodiment of a block diagram for a computing system including a multicore processor according to at least one example embodiment.

FIG. 1 is a block diagram illustrating components associated with improving measurement of noise statistics and BER estimation according to at least one example embodiment. The examples of FIG. 1 are merely examples of components associated with measurement of noise statistics and BER estimation, and do not limit the scope of the claims. For example, operations attributed to a component may vary, number of components may vary, composition of a component may vary, and/or the like. For example, in some example embodiments, operations attributable to one component of the example of FIG. 1 may be allocated to one or more other components.

Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, branch target buffer (BTB) and instruction-translation buffer (I-TLB) 120, load/store buffers, and queues may be shared through partitioning. Other resources, such as general purpose internal registers, page-table base register(s), low-level data-cache and data-TLB 150, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a BTB and I-TLB 120 to predict branches to be executed/taken and a BTB and I-TLB 120 to store address translation entries for instructions.

Core 101 further includes decode module 125 coupled to BTB and I-TLB 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 125, in one embodiment, recognize the same ISA (or a subset thereof). Alternatively, in a heterogeneous core environment, decoders 125 recognize a second ISA (either a subset of the first ISA or a distinct ISA).

In one example, renamer/allocator block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface module 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, device 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

On-chip interface can include a noise statistics and BER estimation module 104. Noise statistics and BER estimation module 104 can be configured to calculate a soft error rate, as described below. Technologies such as Ethernet, PCI express, Thunderbolt, USB, SATA, Infiniband and others can be expected to operate with low BER (e.g., one times ten raised to the power of negative twelve (1e−12) or below). This translates to requirements that can be defined from both receivers and full systems (transmitter+channel+receiver). Validation of this requirement is typically done by a BER test, where a predefined bit sequence (e.g., originating from external test equipment) is fed through a channel into a receiver, and then the received bits are compared to the transmitted bits. To achieve good confidence of the performance, the BER test can span several times the number of bits corresponding to the BER requirement (1/BER), with no errors. For instance, to validate BER<1e−12, a BER test may involve 3 trillion (3e12) bits, the time for the test dependent on the bit rate. For 10G Ethernet, bit duration is 97 ps, so a full BER test of a single link takes about 5 minutes.

The duration of a BER test can results in very long validation cycles, and can make it impossible to perform such tests on each device during manufacturing. To overcome this issue, sometimes tests with increased "stress" are performed. The increased stress creates higher BER which can be measured over a shortened duration. To enable fast quality assessment, a known method is measurement of a timing margin using a variable timing stress (see reference), known as BERT scanning. This measurement results in a so-called "bathtub curve" which shows the BER at various timing stress levels; extrapolation of the curve can be used to assess the BER at low stress levels (without actually measuring the low BER). BERT scanning can be implemented in test equipment known as BERT (Bit Error Rate Tester). Some BERT devices can also apply noise stress to measure voltage margin, but this is less frequently used.

Traditional BERT scanning approaches can involve specialized and expensive equipment that is to be connected to the receiver using designated electrical connections. Such equipment and connections may not always be available however. Also, a BERT scan may not be performed during normal link operation, since a known pattern must be transmitted. Therefore, assessment of "link health" using BER test requires disruption of normal operation. Further, the additional stress typically causes larger degradation of performance than could be expected, due to side effects in the receiver. For example, transmitting with jitter can create distortion of the signal or disrupt adaptive equalization; adding noise can impact the performance of the receiver's clock data recover (CDR) loop. Thus, results of BERT scan can be inherently pessimistic.

Figure 2:
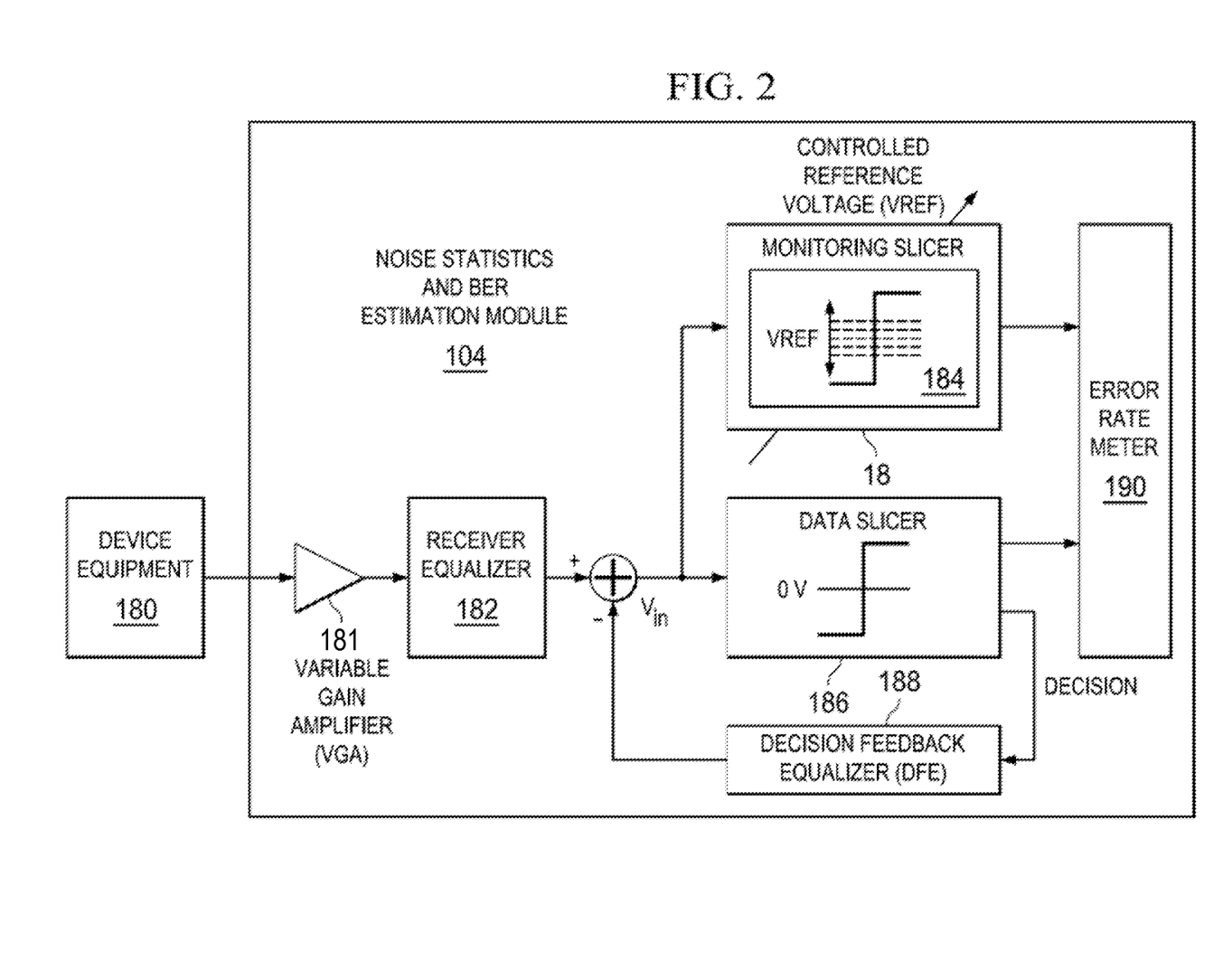
FIG. 2 illustrates an embodiment of a block diagram according to at least one example embodiment.

Referring to FIG. 2, an embodiment of noise statistics and BER estimation module 104 is illustrated. Noise statistics and BER estimation module 104 can include a variable gain amplifier (VGA) 181, a receiver equalizer 182, a monitoring slicer 184, a data slicer 186, a decision feedback equalizer (DFE) 188, and an error rate meter 190. Data slicer 186 can be a receiver decision device (e.g., a device utilized to determine the value of a bit at the receiver). Monitoring slicer 184 can be provided in connection with the provided BER estimation functionality and can serve as the decision device for the BER estimation module 104. In some implementations, the monitoring slicer 184 may be located at the end of a receiver chain of a high-speed receiver.

A data slicer can be sensitive to noise, signal degradation, and other transients appearing in data received at a receiver. The voltage margin of a receiver can be defined as follows: if the probability of the event "the absolute received signal level at the sampling instant is below VM" is P, then the voltage margin at probability P is VM. Consequently, if the data slicer requires a minimum voltage level VM to determine a binary value correctly, then fulfilling a BER condition for the receiver is achieved through a voltage margin (at a particular BER probability) larger than VM.

Monitoring slicer 184 can include a configurable reference voltage level (VREF). The decision level voltage (or "monitor level") of the monitoring slicer can be adjustable, in order for the monitoring slicer to detect "1"s at a variety of voltage levels. Accordingly a range of signal samples can be provided and the output of the monitoring slicer can serve as a reference for these signals. The monitoring slicer can sample a signal concurrently with a data slicer 186, and each can provide a single bit output per sample. For example, if the sampled voltage is above the variable VREF level of the monitoring slicer, monitoring slicer 184 can output "1" and if the sampled voltage is lower than VREF, monitor slicer 184 can output "0". Similarly, the data slicer of the receiver can attempt to also decide values present on the signal using the minimum voltage margin characteristics of the receiver. While some of the examples specifically describe the BER being analyzed in the voltage domain, if timing is modified, then the BER can also be analyzed in the timing domain.

For any input signal, the monitor slicer and data slicer, at any particular instance, can decide whether to output a "1" or a "0". The monitor level can be scanned or adjusted over a voltage ranges, and for each level, the respective outputs of the monitor slicer and data slicer can be compared. If the monitor level is adjusted to a positive value, any event where the data slice outputs "1" by the monitor slicer outputs "0" can be determined to be a "soft error." Similarly, if the monitor level is set to a negative value, if the data slicer outputs a "0" and the monitor slicer outputs a "1" can also be defined as a "soft error." By counting the number of soft errors detected at a particular monitor level V, the probability P(V) can be measured. In some instances, P(V) can resemble a cumulative distribution for a Gaussian random variable, or the complementary error function erfc(V) or Q-function Q(V).

Described differently, if VREF is set to 0 (corresponding to data slicer 186), and assuming the input signal enables correct decisions of data slicer 186 (no "hard errors"), the soft error rate (SER) should be 0. A soft error can be defined as a sampled input level Vin (at the sampling instant) which is between the respective reference levels of data slicer 186 and monitoring slicer 184, or within [0, VREF]. Such input would result in different outputs of the two slicers. If VREF is set to V1 (median of the absolute signal level), then the probability of Vin<VREF can be one-half (or the median), so the SER should also be one-half. For any other VREF setting, the SER represents the probability of the signal being in the region between the two reference levels of the monitor slicer and data slicer.

In one embodiment, under appropriate assumptions such as stationarity, ergodicity, and symmetry of the random process that create noise, the SER may be estimated by counting soft error events over a large enough number of candidate bits, and normalizing by the number of candidate bits. The resolution of this estimate depends on the period; for example, if the SER is around one times ten raised to the power of negative nine (1e−9), the measurement should span a period of more than ten raised to the power of nine (1e9) candidate bits (e.g, in order to get a statistically acceptable confidence level). However, if the SER is around one times ten raised to the power of negative three (1e−3), a few thousand candidate bits may be sufficient data to generate the result with the desired resolution (as the order of magnitude can be sufficient).

If the measurement is done with a perfectly symmetrical bit sequence, the SER ican beindependent of the polarity of VREF. However, in practice, the bit sequence can be biased over the measured period, and thus the result can also be biased; for example, if VREF is positive, then negative inputs cannot generate soft errors (even if they are very close to 0). To remove the dependency on bit sequence, the candidate bits should include only "1" bits if VREF is positive, and only "0" bits if VREF is negative.

Figure 3:
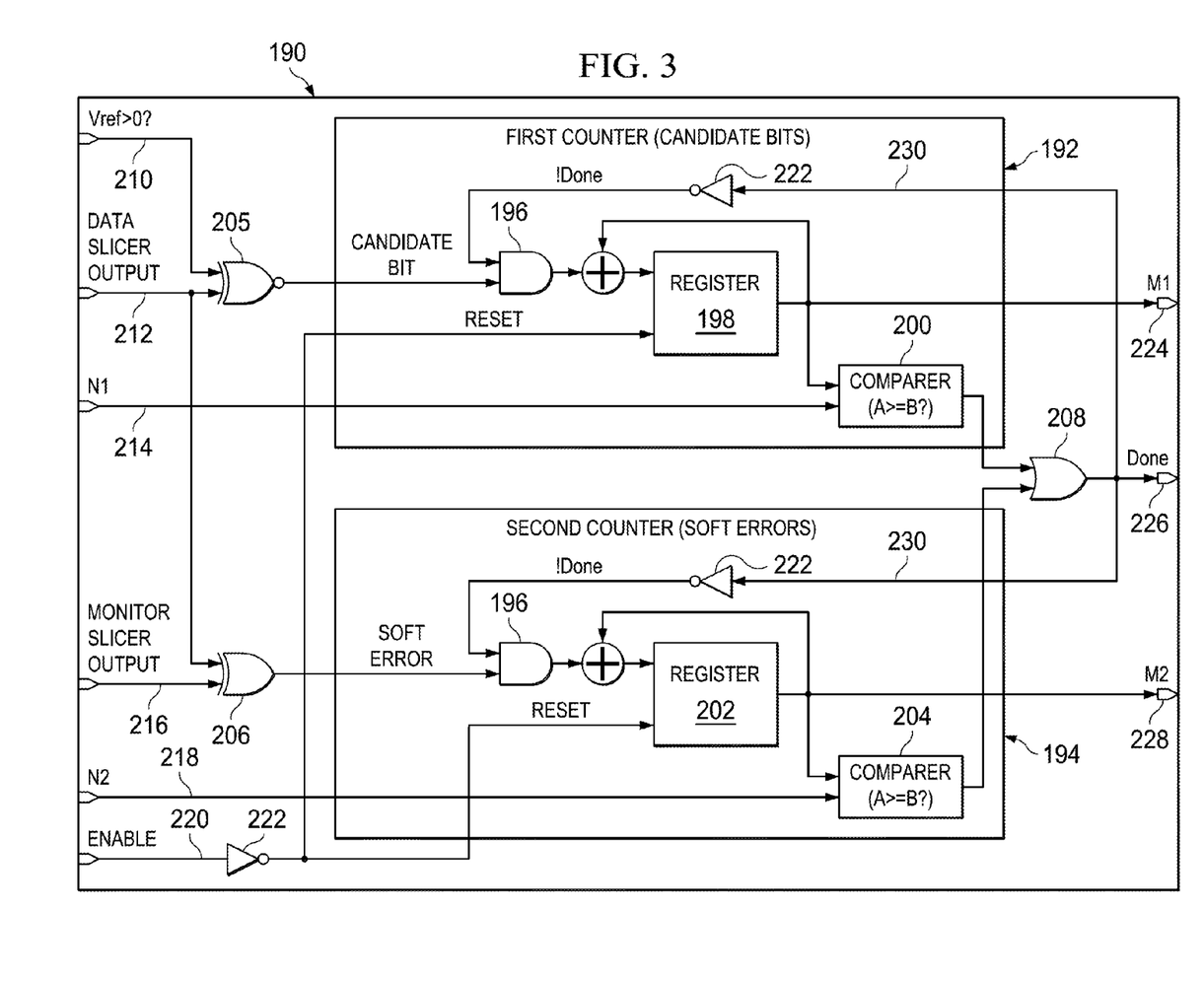
FIG. 3 illustrates an embodiment of a block diagram according to at least one example embodiment.

Referring to FIG. 3, an embodiment of error rate meter 190 is illustrated. Error rate meter 190 can include a first counter 192, a second counter 194, exclusive nor (XNOR) gate 205, exclusive or (XOR) gate 206, OR gate 208, and inverters 222. First counter 192 can include an AND gate 196, first register 198, first comparer 200, and inverter 222. Second counter 194 can include AND gate 196, second register 202, second comparer 204, and inverter 222.

Error rate meter 190 can receive a reference voltage polarity signal 210, a data slicer output signal 212, a N1 signal 214, a monitor slicer output signal 216, a N2 signal 218, and an enable signal 220. N1 signal 214 includes the maximum number of candidate bits that are to be tested before terminating the measurement. N2 signal includes the maximum number of soft errors that can accumulate before terminating the measurement. Reference voltage polarity signal 210 is a "1" if the reference voltage (used by monitor slicer 184) is above zero and is a "0" if the reference voltage is below zero. Recall that monitor slicer 184 outputs (as monitor slicer output 212) a "1" if the sampled voltage is above VREF and if the sampled voltage is lower than VREF, monitor slicer 184 outputs a "0". Reference voltage polarity signal 210 and data slicer output 212 can be sent to XNOR gate 205 and the output of XNOR gate 205 can be sent to first counter 192. This allows first counter 192 to count only the proper candidate bits (e.g., count the '1' bits when Vref >0 and the '0' bits when Vref <0). In addition, data slicer output signal 212 and monitor slicer output signal 216 can be sent to (a different) XOR gate 206 and the output of XOR gate 206 is sent to second counter 194.

First counter 192 counts candidate bits and when the count reaches a predetermined threshold (e.g., N1 signal 214), first counter 192 stops counting and asserts a "done" signal 230. Second counter 194 counts soft errors and when the count reaches a predetermined threshold (e.g., N2 signal 218), second counter 194 stops counting and asserts "done" signal 230. If either first counter 192 or second counter 194 asserts a "done" signal 230, then enough data is available for a measurement of noise statistics and calculation of a BER estimation and both counters stop counting so that their outputs are stable for reading.

Measurement of noise statistics and BER estimation may start by setting N1 signal 214 and N2 signal 218. "Done" signal 230 can be repeatedly polled and when asserted, first counter value M1 224 is read from first register 198 and second counter value M2 228 is read from second register 202. The SER estimate (at the specific VREF) is then M2/(2*M1). For large SER values, second counter 194 may saturate so that M2=N2. Thus the estimate range is between $2/(2*N2)=\frac{1}{2}$ and $N2/(2*N1)$, with inverse-linear steps. For small SER values, first counter 192 may saturate so that M1=N1. Thus the estimate range is between $N2/(2*N1)$ and $0/(2*N1)=0$, with linear steps. The maximum time required for a single measurement may be approximately 2*N1 bit periods, assuming the data is approximately symmetric. For SER values larger than $N2/(2*N1)$, the measurement time will be shorter and inverse-proportional to the SER. This is similar to the behavior of commercial BERT scan systems.

By scanning VREF from some high enough level down to zero, and then from a low enough level up to zero (e.g. from 2*V1 to 0 and then from −2*V1 up to 0) and recording the SER at each level, the sampled cumulative probability function of Vin can be obtained, referred to sometimes as a voltage "bathtub curve."

In fact, the measurement can be shortened by stopping at the desired resolution (e.g. if SER<10-12 was measured at VREF=Vmin, measurements between Vmin and 0 can be skipped). The process of scanning VREF, waiting for the done signal, and calculating the SER and the PDF can be done by an on-chip logic (e.g., on-chip interface 110) and state machine, or alternatively by external software.

Figure 4:
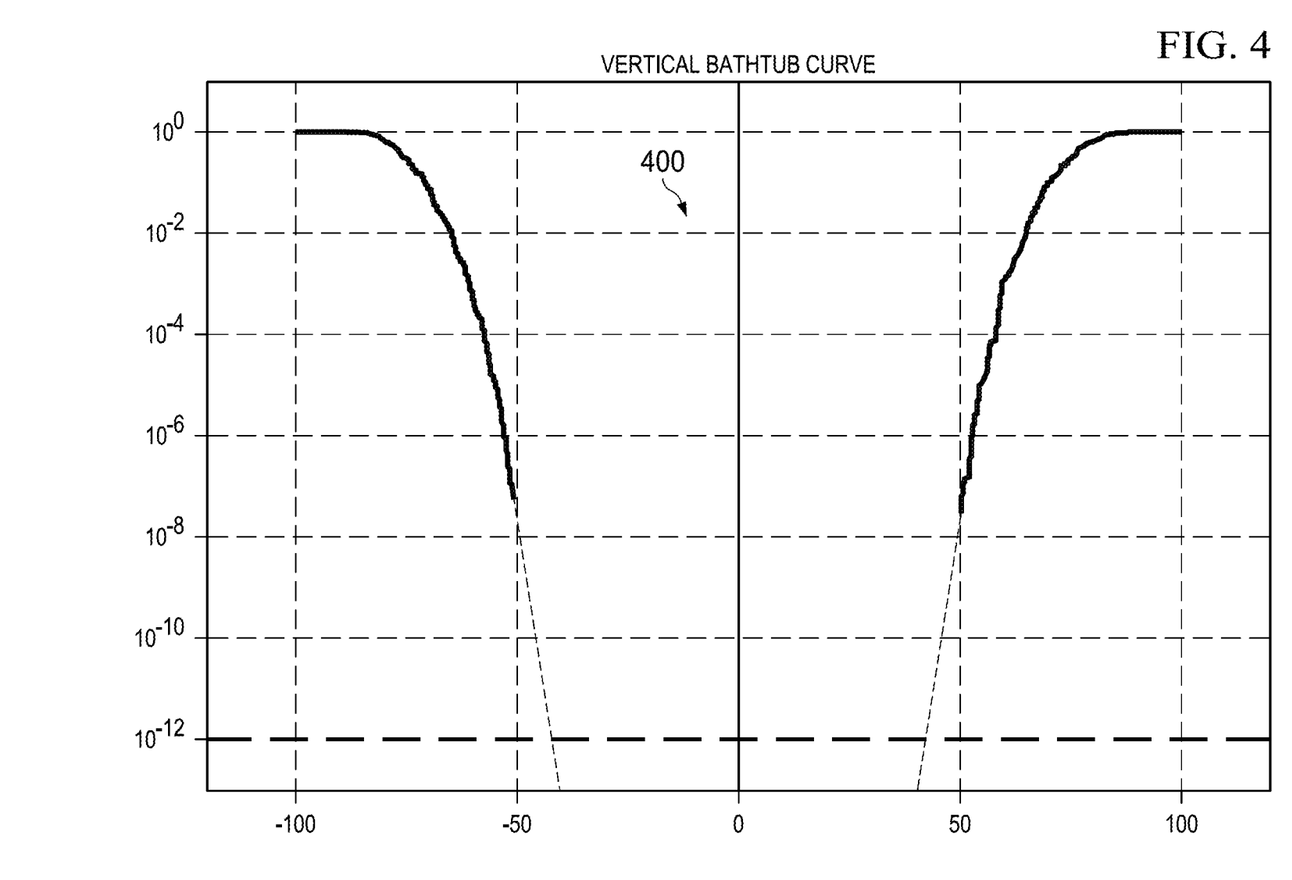
FIG. 4 illustrates an embodiment of a graph according to at least one example embodiment.
Figure 5:
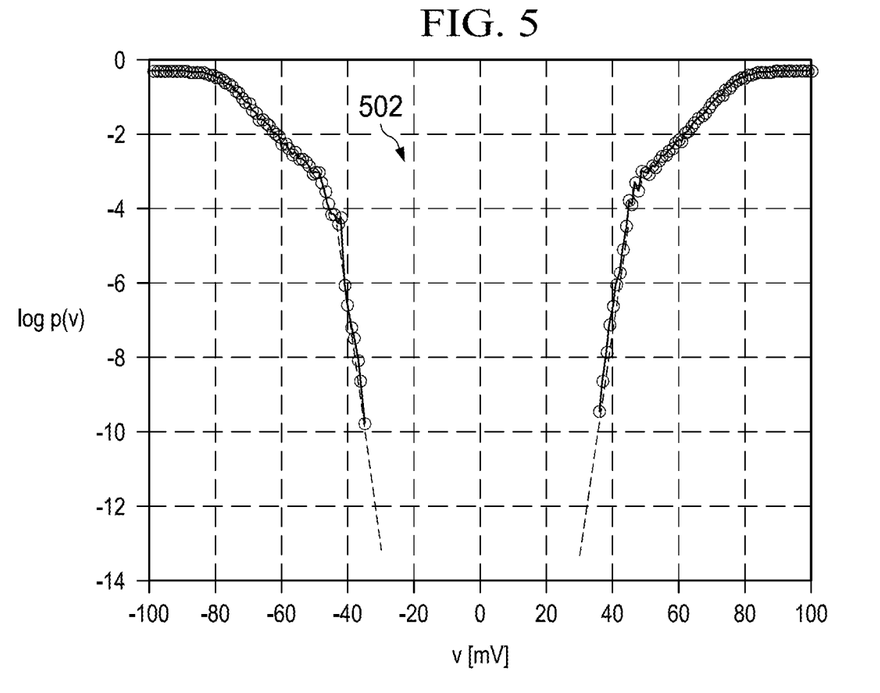
FIG. 5 illustrates an embodiment of a graph according to at least one example embodiment.

Referring to FIG. 4, an embodiment of a cumulative probability function, or bathtub curve, is illustrated. The bathtub curve measurement 400 is based on estimating the soft error rate (SER) and can be generated or calculated based on a series of monitoring sessions at a range of reference voltages, each session generating a respective SER. In the particular example of FIG. 4, a bathtub curve has been generated, representing that at around −48 millivolts and around 48 millivolts there is about a 1e−12 probability of receiving an error bit. Referring to FIG. 5, another embodiment of a bathtub curve is illustrated. The bathtub curve measurement 502 illustrates that around −40 millivolts and +40 millivolts there is about a one times ten raised to the power of negative six (1e−6) probability of receiving an error bit. Based on the measurements taken, an extrapolation can be made such that around −30 millivolts and +30 millivolts there is about a 1e−12 probability of receiving an error bit.

Figure 6:
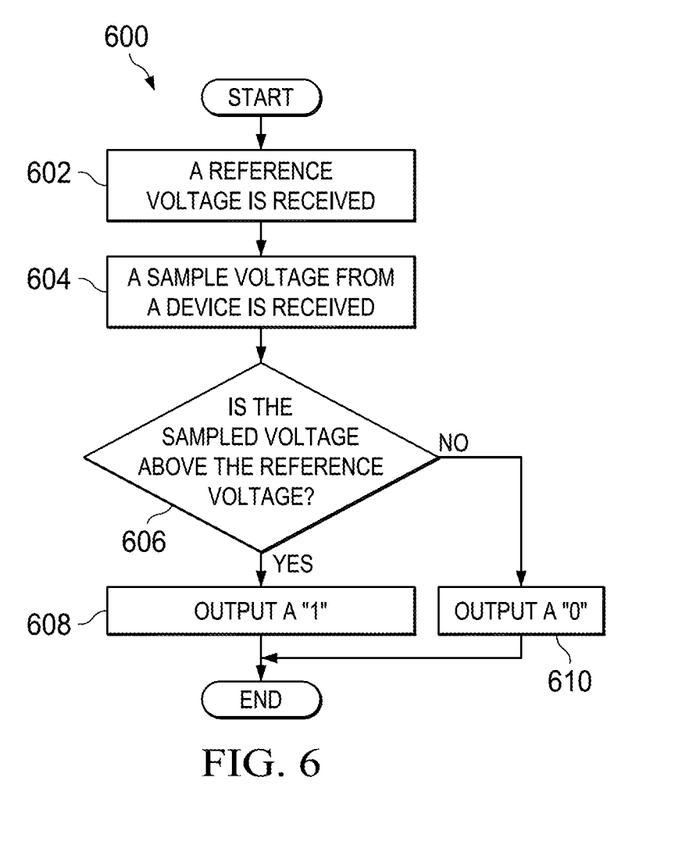
FIG. 6 illustrates a flow diagram according to at least one example embodiment.

FIG. 6 is a flow diagram showing a set of operations 600 according to at least one example embodiment. Apparatus, for example noise statistics and BER estimation module 104 of FIG. 1, or a portion thereof, may utilize the set of operations 600. The apparatus may comprise means for performing the operations of FIG. 6. In an example embodiment, an apparatus is transformed by having memory, for example memory 175 of FIG. 1, comprising computer code configured to, working with a processor, cause the apparatus to perform set of operations 600.

At block 602, a reference voltage is received (e.g., monitoring slicer 184 may receive reference voltage polarity signal 210). At block 604, a sample voltage from a device (e.g., device equipment 180) is received. At block 606, the system determines if the sampled voltage is above the reference voltage. If the sampled voltage is above the reference voltage, then the output (from monitoring slicer 184) is "1", as in 608. If the sampled voltage is not above the reference voltage, then the output (from monitoring slicer 184) is "0", as in 610.

Figure 7:
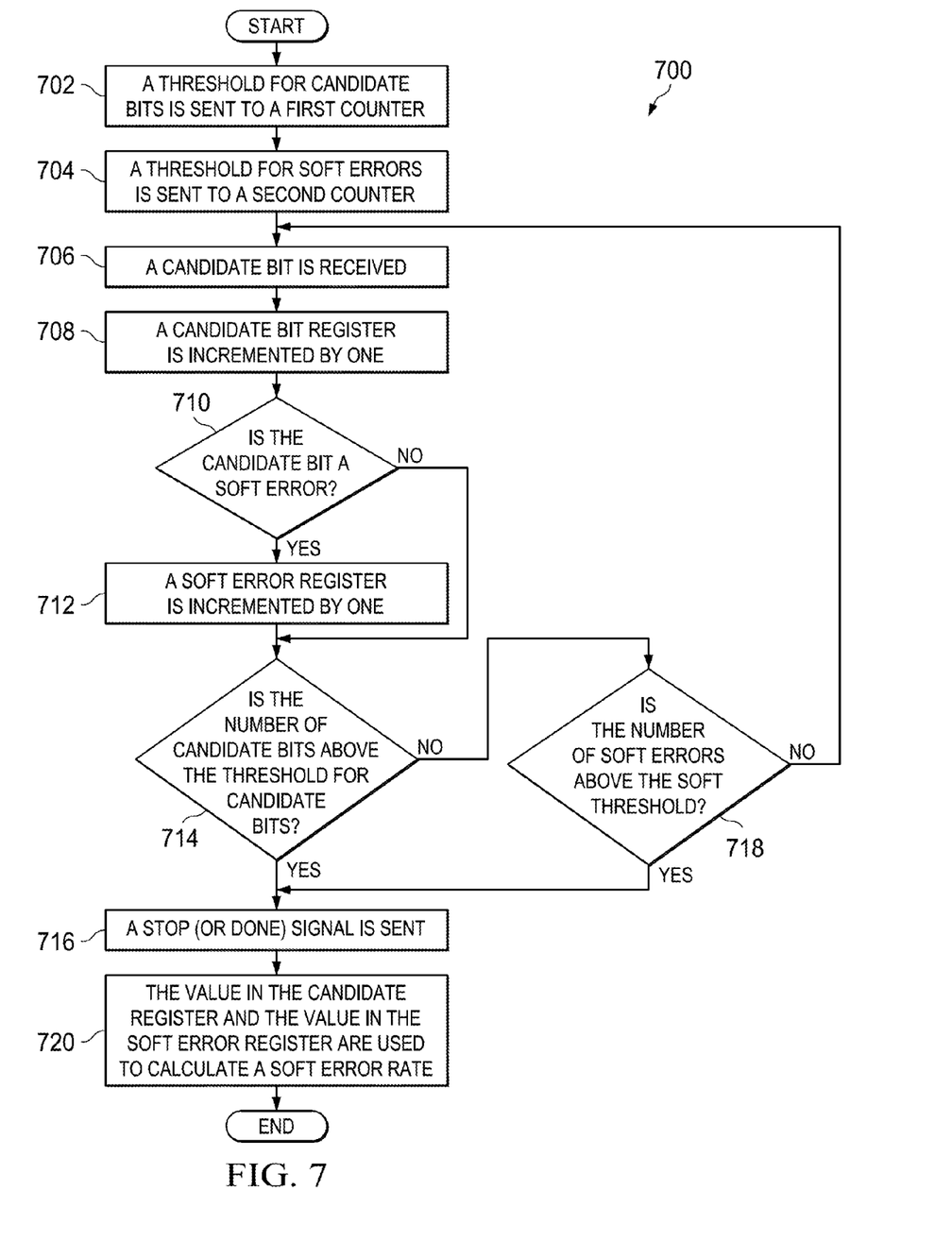
FIG. 7 illustrates a flow diagram according to at least one example embodiment.

FIG. 7 is a flow diagram showing a set of operations 700 according to at least one example embodiment. Apparatus, for example noise statistics and BER estimation module 104 of FIG. 1, or a portion thereof, may utilize the set of operations 700. The apparatus may comprise means for performing the operations of FIG. 7. In an example embodiment, an apparatus is transformed by having memory, for example memory 175 of FIG. 1, comprising computer code configured to, working with a processor, cause the apparatus to perform set of operations 700.

At block 702, a threshold for candidate bits is sent to a first counter. For example, N1 signal 214 may be sent to first counter 192. At block 704, a threshold for soft errors is sent to a second counter. For example, N2 signal 218 may be sent to second counter 194. At block 706, a candidate bit is received. At block 708, a candidate bit register is incremented by one. For example, first register 198 may be incremented by one. At block 710, the system determines if the candidate bit is a soft error (or error bit). If the candidate bit is a soft error (or error bit), then a soft error register is incremented by one, as in 712. For example, second register 202 may be incremented by one. At block 714, the system determines if the number of candidate bits is above the threshold for candidate bits. Going back to block 710, if the candidate bit is not a soft error (or error bit), then the system determines if the number of candidate bits is above the threshold for candidate bits, as in 714.

If the number of candidate bits is above the threshold for candidate bits, then a stop (or done) signal is sent, as in 716. At block 720, the value in the candidate register and the value in the soft error register are used to calculate a soft error rate. If the number of candidate bits is not above the threshold for candidate bits, then the system determines if the number of soft errors is above the soft errors threshold, as in 718. If the number of soft errors is above the soft errors threshold, then a stop (or done) signal is sent, as in 716. At block 720, the value in the candidate register and the value in the soft error register are used to calculate a soft error rate. If the number of soft errors is not above the soft error threshold, then (another) candidate bit is received, as in 706.

Figure 8:
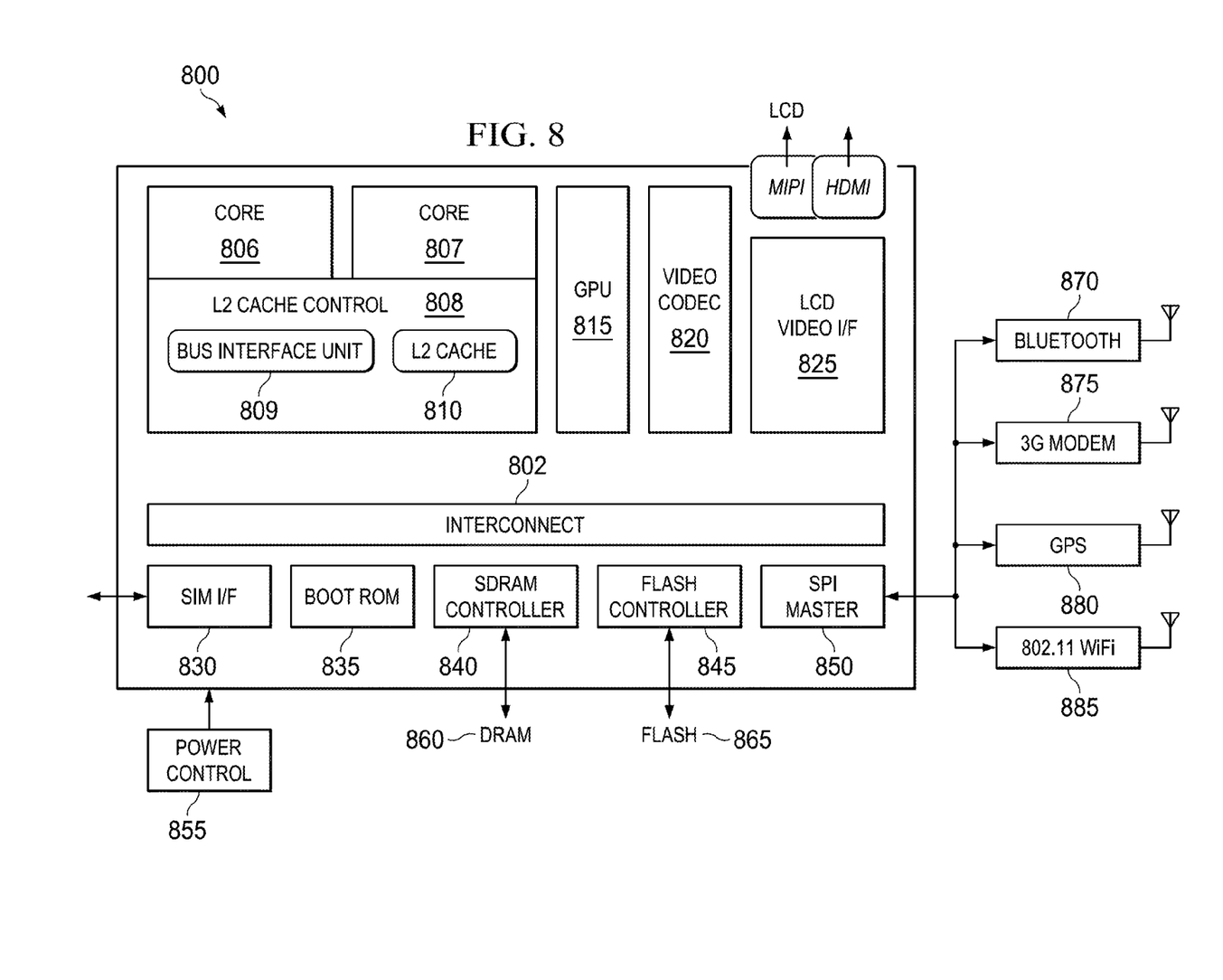
FIG. 8 illustrates an embodiment of a block diagram associated with an example ARM ecosystem system on chip (SOC) according to at least one example embodiment.

FIG. 8 is a simplified block diagram associated with an example ARM ecosystem SOC 800 of the present disclosure. At least one example implementation of the present disclosure includes an integration of the measurement of noise statistics and BER estimation features discussed herein and an ARM component. For example, the example of FIG. 8 can be associated with any ARM core (e.g., A-9, A-15, etc.). Further, the architecture can be part of any type of tablet, smartphone (inclusive of Android™ phones, i-Phones™), i-Pad™, Google Nexus™, Microsoft Surface™, personal computer, server, video processing components, laptop computer (inclusive of any type of notebook), any type of touch-enabled input device, etc.

In this example of FIG. 8, ARM ecosystem SOC 800 may include multiple cores 806-807, an L2 cache control 808, a bus interface unit 809, an L2 cache 810, a graphics processing unit (GPU) 815, an interconnect 802, a video codec 820, and a liquid crystal display (LCD) I/F 825, which may be associated with mobile industry processor interface (MIPI)/high-definition multimedia interface (HDMI) links that couple to an LDC.

ARM ecosystem SOC 800 may also include a subscriber identity module (SIM) I/F 830, a boot read-only memory (ROM) 835, a synchronous dynamic random access memory (SDRAM) controller 840, a flash controller 845, a serial peripheral interface (SPI) master 850, a suitable power control 855, a dynamic RAM (DRAM) 860, and flash 865. In addition, one or more example embodiment include one or more communication capabilities, interfaces, and features such as instances of Bluetooth 870, a 3G modem 875, a global positioning system (GPS) 880, and an 802.11 WiFi 685.

In operation, the example of FIG. 8 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 9:
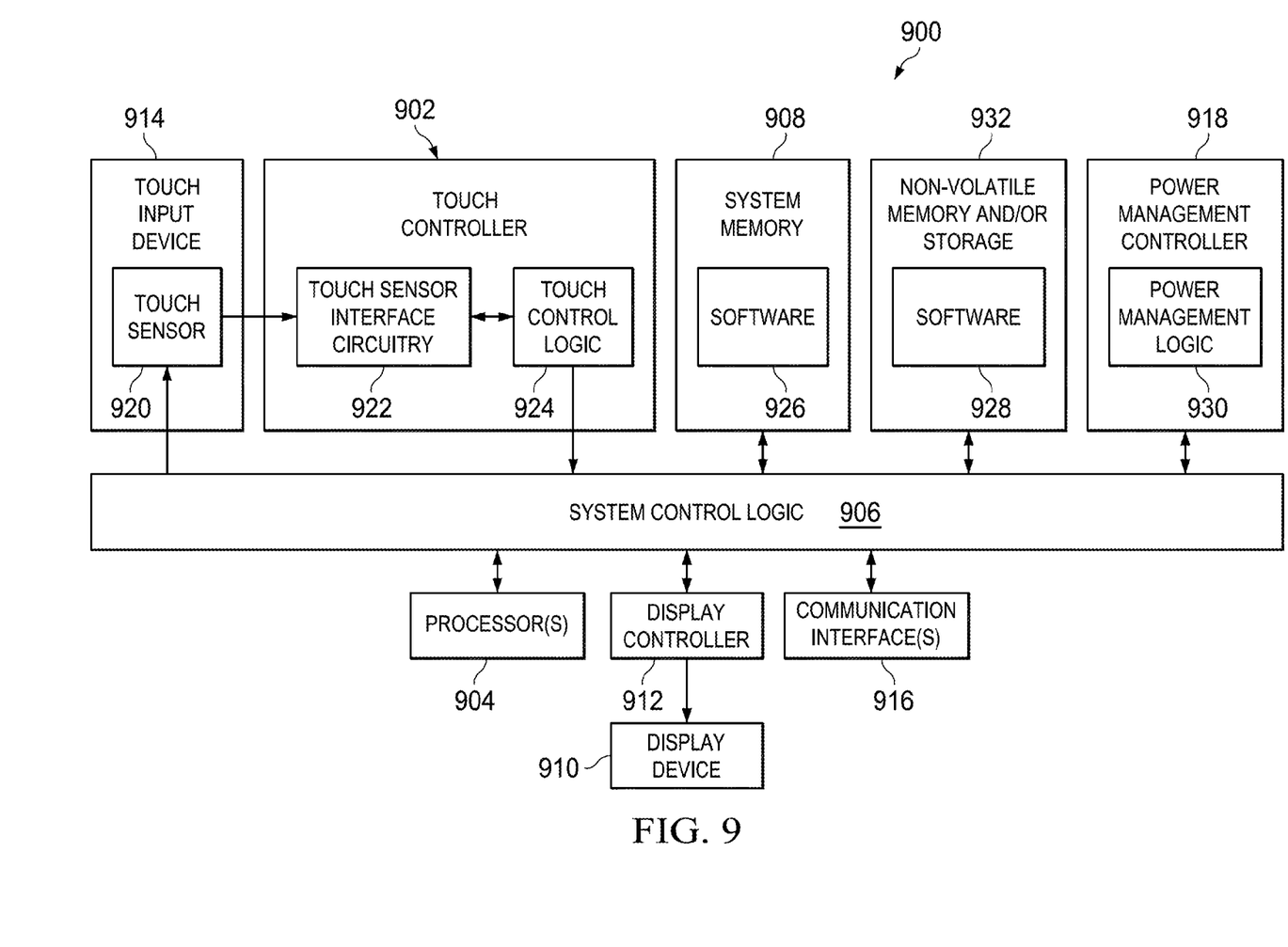
FIG. 9 illustrates an embodiment of a block diagram illustrating example logic that may be used to execute activities according to at least one example embodiment.

FIG. 9 is a simplified block diagram illustrating potential electronics and logic that may be associated with any of the measurement of noise statistics and BER estimation operations discussed herein. In at least one example embodiment, system 900 includes a touch controller 902, one or more processors 904, system control logic 906 coupled to at least one of processor(s) 904, system memory 908 coupled to system control logic 906, non-volatile memory and/or storage device(s) 910 coupled to system control logic 906, display controller 912 coupled to system control logic 906, display controller 912 coupled to a display, power management controller 918 coupled to system control logic 906, and/or communication interfaces 916 coupled to system control logic 906.

System control logic 906, in at least one embodiment, includes any suitable interface controllers to provide for any suitable interface to at least one processor 904 and/or to any suitable device or component in communication with system control logic 906. System control logic 906, in at least one example embodiment, includes one or more memory controllers to provide an interface to system memory 908. System memory 908 may be used to load and store data and/or instructions, for example, for system 900. System memory 908, in at least one example embodiment, includes any suitable volatile memory, such as suitable dynamic random access memory (DRAM) for example. System control logic 906, in at least one example embodiment, includes one or more input/output (I/O) controllers to provide an interface to a display device, touch controller 902, and non-volatile memory and/or storage device(s) 910.

Non-volatile memory and/or storage device(s) 910 may be used to store data and/or instructions, for example within software 928. Non-volatile memory and/or storage device(s) 910 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 918 may include power management logic 930 configured to control various power management and/or power saving functions disclosed herein or any part thereof. In at least one example embodiment, power management controller 918 is configured to reduce the power consumption of components or devices of system 900 that may either be operated at reduced power or turned off when the electronic device is in the closed configuration. For example, in at least one example embodiment, when the electronic device is in a closed configuration, power management controller 918 performs one or more of the following: power down the unused portion of a display and/or any backlight associated therewith; allow one or more of processor(s) 904 to go to a lower power state if less computing power is required in the closed configuration; and shutdown any devices and/or components, such as a keyboard, that are unused when an electronic device is in the closed configuration.

Communications interface(s) 920 may provide an interface for system 900 to communicate over one or more networks and/or with any other suitable device. Communications interface(s) 920 may include any suitable hardware and/or firmware. Communications interface(s) 920, in at least one example embodiment, may include, for example, a network adapter, a wireless network adapter, a telephone modem, and/or a wireless modem.

System control logic 906, in at least one example embodiment, includes one or more input/output (I/O) controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one example embodiment, at least one processor 904 may be packaged together with logic for one or more controllers of system control logic 906. In at least one example embodiment, at least one processor 904 may be packaged together with logic for one or more controllers of system control logic 906 to form a System in Package (SiP). In at least one example embodiment, at least one processor 904 may be integrated on the same die with logic for one or more controllers of system control logic 906. For at least one example embodiment, at least one processor 904 may be integrated on the same die with logic for one or more controllers of system control logic 906 to form a System on Chip (SoC).

For touch control, touch controller 902 may include touch sensor interface circuitry 922 and touch control logic 924.

Touch sensor interface circuitry 922 may be coupled to detect touch input over a first touch surface layer and a second touch surface layer of a display (i.e., display device 910). Touch sensor interface circuitry 922 may include any suitable circuitry that may depend, for example, at least in part on the touch-sensitive technology used for a touch input device. Touch sensor interface circuitry 922, in one embodiment, may support any suitable multi-touch technology. Touch sensor interface circuitry 922, in at least one embodiment, includes any suitable circuitry to convert analog signals corresponding to a first touch surface layer and a second surface layer into any suitable digital touch input data. Suitable digital touch input data for one embodiment may include, for example, touch location or coordinate data.

Touch control logic 924 may be coupled to help control touch sensor interface circuitry 922 in any suitable manner to detect touch input over a first touch surface layer and a second touch surface layer. Touch control logic 924 for at least one example embodiment may also be coupled to output in any suitable manner digital touch input data corresponding to touch input detected by touch sensor interface circuitry 922. Touch control logic 924 may be implemented using any suitable logic, including any suitable hardware, firmware, and/or software logic (e.g., non-transitory tangible media), that may depend, for example, at least in part on the circuitry used for touch sensor interface circuitry 922. Touch control logic 924 for one embodiment may support any suitable multi-touch technology.

Touch control logic 924 may be coupled to output digital touch input data to system control logic 906 and/or at least one processor 904 for processing. At least one processor 904 for one embodiment may execute any suitable software to process digital touch input data output from touch control logic 924. Suitable software may include, for example, any suitable driver software and/or any suitable application software. As illustrated in FIG. 9, system memory 908 may store suitable software 926 and/or non-volatile memory and/or storage device(s).

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, and a method to provide a first slicer element to receive a sample voltage from a device, determine a first value corresponding to the sample voltage, and further provide a second slicer element to receive the sample voltage, determine a second value corresponding to the sample voltage, wherein the second value is to be determined based on a comparison of the sample voltage with a reference voltage of the second slicer element, and logic to compare the first value and the second value.

In at least one example, the reference voltage comprises an adjustable reference voltage.

In at least one example, the second slicer element is to adjust the reference voltage to a different reference voltage, and determine a different value corresponding to the sample voltage based on a comparison of the sample voltage with the different reference voltage.

In at least one example, the logic is further to determine whether the reference voltage is positive or negative.

In at least one example, the second value is to be a "1" if the sample voltage is greater than the reference voltage and a "0" if the sample voltage is less than the reference voltage.

In at least one example, the logic is further to determine a soft error based on the comparison of the first value and second value.

In at least one example, a soft error is to be determined when the second value does not match the first value.

In at least one example, the sample voltage is one of a series of sample voltages included in a signal, the first slicer element is to determine values for each of the sample voltages, the second slicer element is to determine values for each of the sample values, and the logic is to compare corresponding values determined by each of the first and second slicer elements to calculate a soft error ratio corresponding to the reference voltage.

In at least one example, the logic is to determine a threshold number of candidate bits and generate the soft error ratio in response to detecting a number of candidate bits equal or greater than the threshold number of candidate bits.

In at least one example, the logic is to determine a threshold number of soft errors and generate the soft error ratio in response to detecting a number of soft errors equal or greater than the threshold number of soft errors.

In at least one example, the logic is to determine a threshold number of candidate bits and a threshold number of soft errors and generate the soft error ratio in response to the earlier of detecting a number of soft errors equal or greater than the threshold number of soft errors and detecting a number of candidate bits equal or greater than the threshold number of candidate bits.

In at least one example, the soft error rate is calculated for the reference voltage by dividing a number of detected soft errors by twice a number of detected candidate bits.

In at least one example, each candidate bit represents a "1" value determined by the first slicer element from the series of sample voltages.

In at least one example, the logic is to determine a plurality of soft error ratios for each of a range of reference voltages.

In at least one example, the logic is to determine a cumulative probability function for a receiver from the plurality of soft error ratios.

In at least one example, the signal is to be sent during live operation of a link.

One or more embodiments may provide an apparatus, a system, a machine readable storage, a machine readable medium, and a method to receive a sample voltage from a device at a first slicer element and a second slicer element, identify a decision by the first slicer element based on the sample voltage, and compare the decision of the first slicer element with a decision of the second slicer element based on the sample voltage, wherein the decision of the second slicer element is to be generated from a comparison of the sample voltage with a reference voltage for the second slicer element.

In at least one example, the reference voltage can be adjusted to a different reference voltage, another sample voltage is received at the first and second slicer elements, a second decision is identified by the first slicer element based on the other sample voltage, and the second decision of the first slicer element is compared with a second decision of the second slicer element based on the other sample voltage, wherein the second decision of the second slicer element is to be generated from a comparison of the other sample voltage with the different reference voltage.

In at least one example, decision of the second slicer is to be a "1" if the sample voltage is greater than the reference voltage and a "0" if the sample voltage is less than the reference voltage.

In at least one example, a soft error is determined based on comparing the decision of the first slicer element with the decision of the second slicer element.

In at least one example, a soft error is to be determined when the decision of the first slicer element is different from the decision of the second slicer element.

In at least one example, the sample voltage is one of a plurality of sample values in a signal received from the device, the method further comprising determining a number of soft errors corresponding to plurality of sample values.

In at least one example, a soft error ratio is determined corresponding to the reference voltage based on the number of soft errors.

In at least one example, a corresponding soft error ratio id determined for each of a plurality of reference voltages of the second slicer element.

In at least one example, a cumulative probability function is determined for a receiver from the plurality of soft error ratios.

In at least one example, a number of candidate bits is determined in the plurality of sample values.

In at least one example, the soft error rate is determined for the reference voltage by dividing the number of soft errors by twice the number of candidate bits.

In at least one example, the decision of the first slicer element is to be a "1" if the sample voltage is greater than a reference voltage of the first slicer element and a "0" if the sample voltage is less than the reference voltage of the first slicer element, and the reference voltage of the first slicer element is approximately zero.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a first slicer element to:
      receive a sample voltage from a device;
      determine a first binary value corresponding to the sample voltage;
   a second slicer element to:
      receive the sample voltage;
      determine a second binary value corresponding to the sample voltage, wherein the second binary value is to be determined based on a comparison of the sample voltage with a reference voltage of the second slicer element; and
   logic to:
      compare the first binary value and the second binary value; and
      generate a particular output to indicate that the first and second binary values do not match, wherein the output is to indicate a soft error associated with the sample voltage and is to be used in determining a soft error ratio for a signal, and the signal comprises the sample voltage.

2. The apparatus of claim 1, wherein the reference voltage comprises an adjustable reference voltage.

3. The apparatus of claim 2, wherein the second slicer element is to:
   adjust the reference voltage to a different reference voltage;
   determine a different value corresponding to the sample voltage based on a comparison of the sample voltage with the different reference voltage.

4. The apparatus of claim 1, wherein the logic is further to determine whether the reference voltage is positive or negative.

5. The apparatus of claim 1, wherein the second binary value is to be a "1" if the sample voltage is greater than the reference voltage and a "0" if the sample voltage is less than the reference voltage.

6. The apparatus of claim 1, wherein the sample voltage is one of a series of sample voltages included in the signal, the first slicer element is to determine values for each of the sample voltages, the second slicer element is to determine values for each of the sample values, and the logic is to compare corresponding values determined by each of the first and second slicer elements to calculate the soft error ratio.

7. The apparatus of claim 6, wherein the logic is to determine a threshold number of candidate bits and generate the soft error ratio in response to detecting a number of candidate bits equal or greater than the threshold number of candidate bits.

8. The apparatus of claim 6, wherein the logic is to determine a threshold number of soft errors and generate the soft error ratio in response to detecting a number of soft errors equal or greater than the threshold number of soft errors.

9. The apparatus of claim 6, wherein the logic is to determine a threshold number of candidate bits and a threshold number of soft errors and generate the soft error ratio in response to the earlier of detecting a number of soft errors equal or greater than the threshold number of soft errors and detecting a number of candidate bits equal or greater than the threshold number of candidate bits.

10. The apparatus of claim 6, wherein the soft error rate is calculated for the reference voltage by dividing a number of detected soft errors by twice a number of detected candidate bits.

11. The apparatus of claim 10, wherein each candidate bit represents a "1" value determined by the first slicer element from the series of sample voltages.

12. The apparatus of claim 6, wherein the logic is to determine a plurality of soft error ratios for each of a range of reference voltages.

13. The apparatus of claim 12, wherein the logic is to determine a cumulative probability function for a receiver from the plurality of soft error ratios.

14. The apparatus of claim 12, wherein the signal is to be sent during live operation of a link.

15. A method comprising:
receiving a sample voltage from a device at a first slicer element and a second slicer element;
identifying a decision by the first slicer element based on the sample voltage;
comparing the decision of the first slicer element with a decision of the second slicer element based on the sample voltage, wherein the decision of the second slicer element is to be generated from a comparison of the sample voltage with a reference voltage for the second slicer element and the decision of the first slicer element comprises a first binary value and the decision of the second slicer element comprises a second binary value;
determining a soft error associated with the sample voltage when the first binary value does not match the second binary value; and
determining a soft error rate for a signal comprising the sample voltage based on the soft error.

16. The method of claim 15, further comprising adjusting the reference voltage to a different reference voltage.

17. The method of claim 16, further comprising:
receiving a second sample voltage at the first and second slicer elements;
identifying a second decision by the first slicer element based on the second sample voltage; and
comparing the second decision of the first slicer element with a second decision of the second slicer element based on the second sample voltage, wherein the second decision of the second slicer element is to be generated from a comparison of the second sample voltage with the different reference voltage.

18. The method of claim 15, wherein the second binary value corresponding to the decision of the second slicer is to be a "1" if the sample voltage is greater than the reference voltage and a "0" if the sample voltage is less than the reference voltage.

19. The method of claim 15, wherein the sample voltage is one of a plurality of sample values in a signal received from the device, the method further comprising determining a number of soft errors corresponding to the plurality of sample values.

20. The method of claim 19, further comprising determining a soft error ratio corresponding to the reference voltage based on the number of soft errors.

21. The method of claim 20, further comprising determining a corresponding soft error ratio for each of a plurality of reference voltages of the second slicer element.

22. The method of claim 21, further comprising determining a cumulative probability function for a receiver from the plurality of soft error ratios.

23. The method of claim 20, further comprising determining a number of candidate bits in the plurality of sample values.

24. The method of claim 23, further comprising determining the soft error rate for the reference voltage by dividing the number of soft errors by twice the number of candidate bits.

25. The method of claim 15, wherein the first binary value corresponding to the decision of the first slicer element is to be a "1" if the sample voltage is greater than a reference voltage of the first slicer element and a "0" if the sample voltage is less than the reference voltage of the first slicer element.

26. The method of claim 25, wherein the reference voltage of the first slicer element is approximately zero.

27. At least one non-transitory machine accessible storage medium having instructions stored thereon, the instructions when executed on a machine, cause the machine to:
identify a decision by a first slicer element based on a sample voltage, wherein the sample voltage is sampled by both the first slicer element and a second slicer element;
compare the decision of the first slicer element with a decision of the second slicer element based on the sample voltage, wherein the decision of the second slicer element is to be generated from a comparison of the sample voltage with a reference voltage for the second slicer element and the decision of the first slicer element comprises a first binary value and the decision of the second slicer element comprises a second binary value;
determine a soft error associated with the sample voltage when the first binary value does not match the second binary value; and
calculate a soft error ratio for a signal comprising the reference voltage based at least in part on comparing the decision of the first slicer element with the decision of the second slicer element.

* * * * *